(12) United States Patent
Yang et al.

(10) Patent No.: US 7,752,741 B1
(45) Date of Patent: Jul. 13, 2010

(54) ASSEMBLY MECHANISM FOR MOTOR STATORS AND ASSEMBLY METHOD FOR THE SAME

(75) Inventors: An-Zheng Yang, Taipei-Hsien (TW); Yi-Cheng Su, Taipei Hsien (TW)

(73) Assignee: Foxnum Technology Co., Ltd., Tucheng, Taipei County (TW)

( * ) Notice: Subject to any disclaimer, the term of this patent is extended or adjusted under 35 U.S.C. 154(b) by 0 days.

(21) Appl. No.: 12/479,701

(22) Filed: Jun. 5, 2009

(30) Foreign Application Priority Data

Dec. 24, 2008 (CN) .................... 200810306512.5

(51) Int. Cl.
*H02K 15/00* (2006.01)
(52) U.S. Cl. .................. 29/732; 29/733; 29/734; 29/596; 29/402.11; 29/267; 310/89; 310/90; 310/323.09
(58) Field of Classification Search ............ 29/700, 29/650, 33 R, 560.1, 596, 34 R, 564.1, 564.5, 29/33 K, 729, 732, 760, 790, 795, 402.19, 29/890.125, 888.092, 893.33; 72/48, 352; 310/323.09; 414/907; 411/54.1; 493/143
See application file for complete search history.

(56) References Cited

U.S. PATENT DOCUMENTS 2,015,462 A * 9/1935 Sachs .................... 164/76.1
2009/0162225 A1 * 6/2009 Lai et al. ................ 417/423.3

* cited by examiner

*Primary Examiner*—Derris H Banks
*Assistant Examiner*—Azm Parvez
(74) *Attorney, Agent, or Firm*—Zhigang Ma

(57) ABSTRACT

An assembly mechanism is provided to press an inner stator into a receiving space of an outer stator. The assembly mechanism includes a pressing unit and a first positioning plate. The pressing unit includes a supporting device to support the outer stator, and a pressing device movable relatively to the supporting device. The first positioning plate is attached to a top of the outer stator. The first positioning plate defines an opening forming a clearance fit with the inner stator. The opening receives the inner stator and guides the inner stator to move into the receiving space of the outer stator under a pressing action of the pressing device. An assembly method is also provided.

12 Claims, 4 Drawing Sheets

ASSEMBLY MECHANISM FOR MOTOR STATORS AND ASSEMBLY METHOD FOR THE SAME

BACKGROUND

1. Technical Field

The present disclosure relates to an assembly mechanism for motor stators and an assembly method for the same.

2. Description of Related Art

When an inner stator is assembled into an outer stator of a motor, the inner stator is apt to be deflected and damaged because the fit tolerance between the inner stator and the outer stator is quite little.

DETAILED DESCRIPTION

Figure 1:
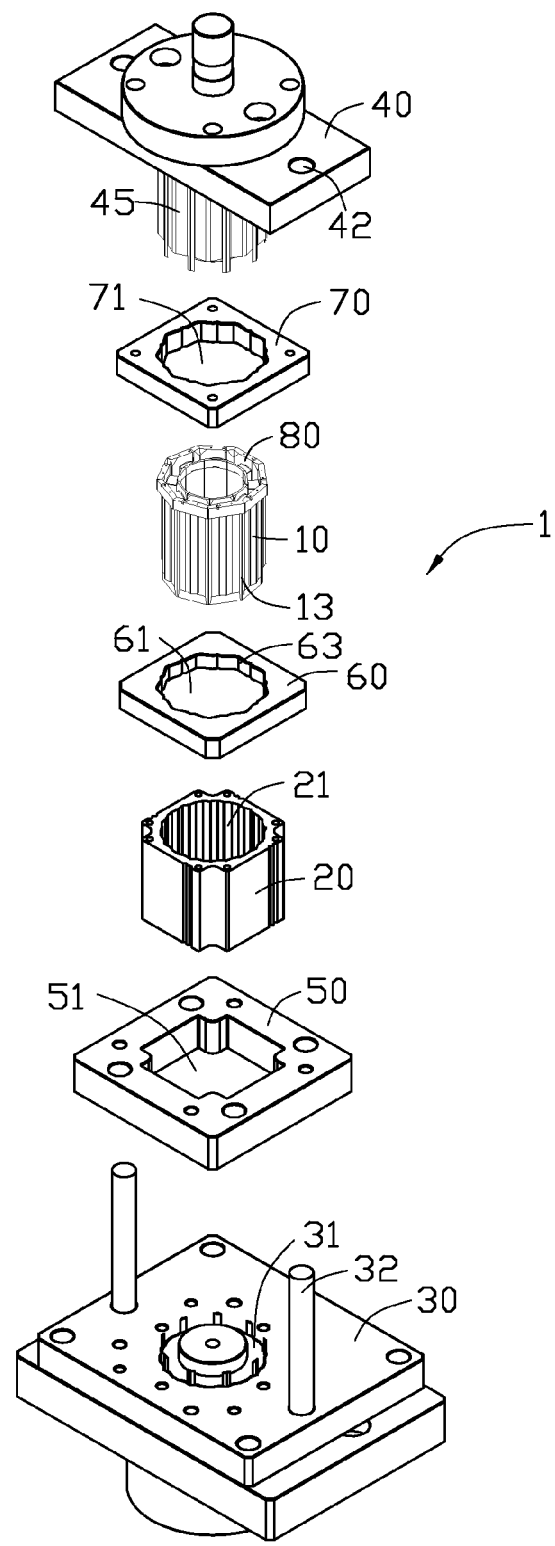
FIG. 1 is an exploded, isometric view of an embodiment of an assembly mechanism for stators of a motor, the assembly mechanism including a first positioning plate.

Referring to FIG. 1, an embodiment of an assembly mechanism 1 for pressing an inner stator 10 into a receiving space 21 of an outer stator 20 includes a pressing unit, a first positioning plate 60, a second positioning plate 50, and a third positioning plate 70. A wire bracket 80 is installed on a top of the inner stator 10.

The pressing unit includes a supporting device 30, and a pressing device 40 movable relatively to the supporting device 30. Two guiding posts 32 are formed on a top of the supporting device 30. A lower die 31 is formed on the top of the supporting device 30, between the guiding posts 32, matching a lower portion of the inner stator 10. The pressing device 40 defines two through holes 42 adjacent to opposite ends of the pressing device 40. The pressing device 40 includes an upper die 45 perpendicularly extending down from the pressing device 40 between the through holes 42.

Figure 2:
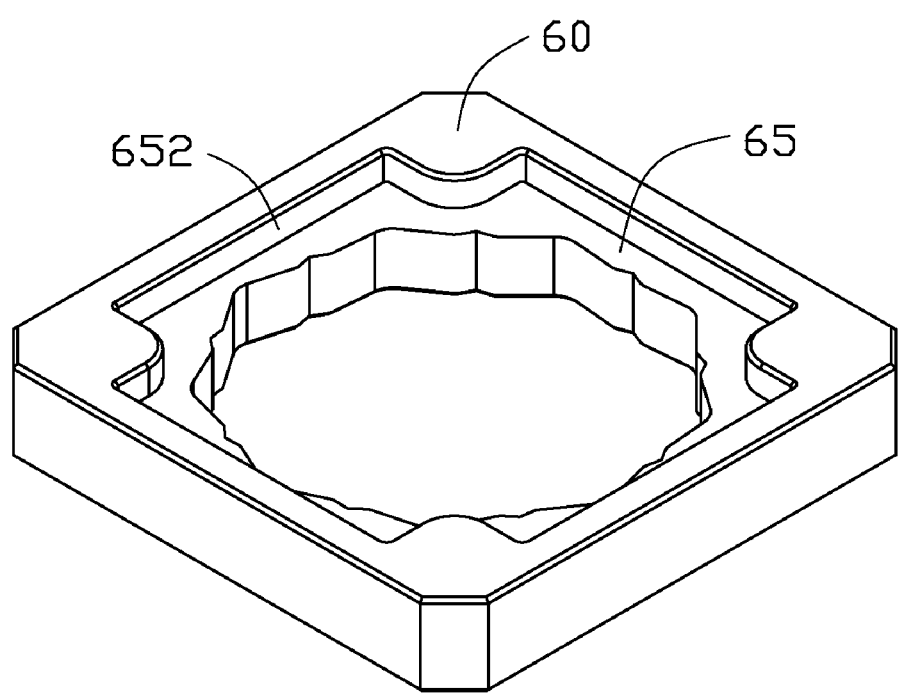
FIG. 2 is an inverted view of the first positioning plate of FIG. 1.

The first positioning plate 60 defines an opening 61 in a middle of the first positioning plate 60. The opening 61 has a dimension forming a clearance fit with a lower portion of the inner stator 10. Referring to FIG. 2, a bottom surface of the first positioning plate 60 defines a recess 65 communicating with the opening 61, matching an upper portion of the outer stator 20. In this embodiment, the inner stator 10 forms a plurality of flanges 13 on a circumference of the inner stator 10, along the axial direction, and an inner wall bounding the opening 61 of the first positioning plate 60 defines a plurality of guiding grooves 63 matching the plurality of flanges 13.

The second positioning plate 50 defines an opening 51 in a middle of the second positioning plate 50. The opening 51 has a dimension forming a clearance fit with a lower portion of the outer stator 20.

The third positioning plate 70 defines an opening 71 in a middle of the third positioning plate 70. The opening 71 has a dimension forming an interference fit with a lower portion of the upper die 45.

Figure 3:
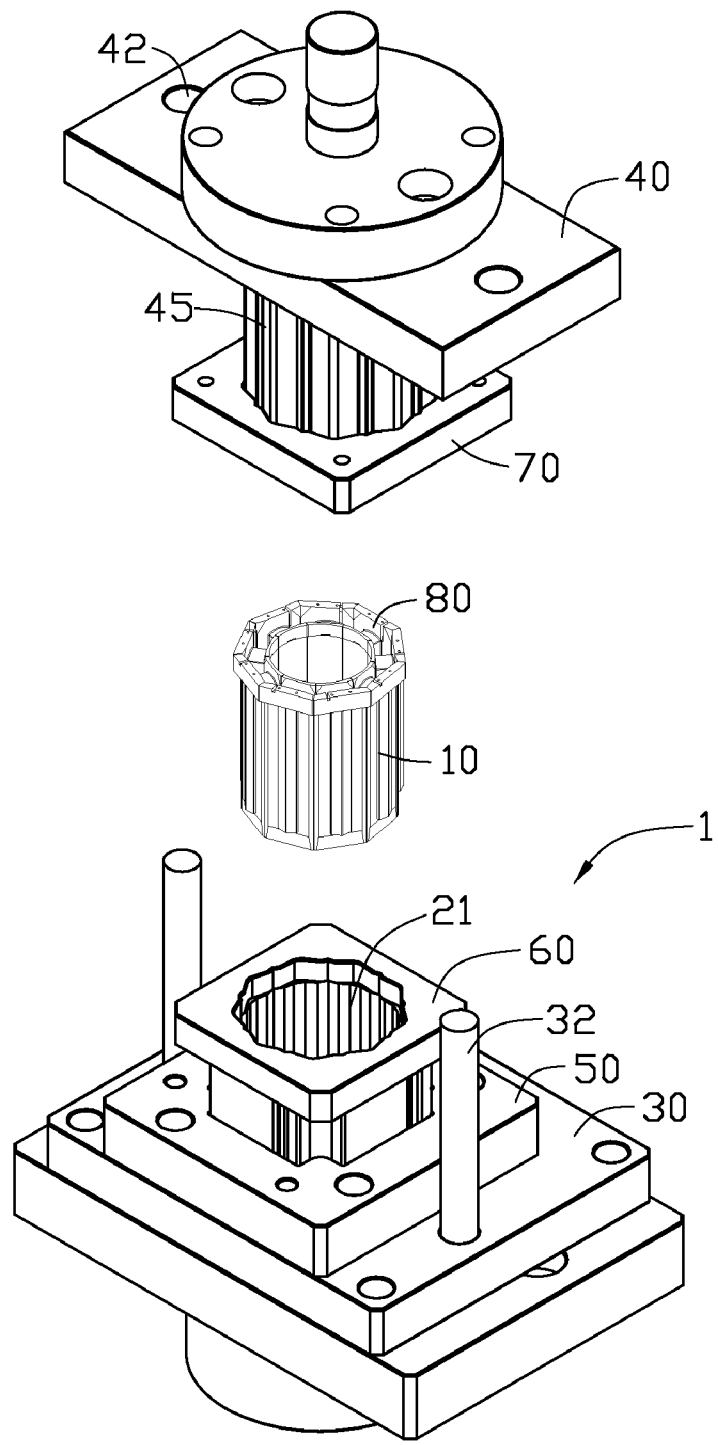
FIG. 3 is a partially assembled, isometric view of FIG. 1.
Figure 4:
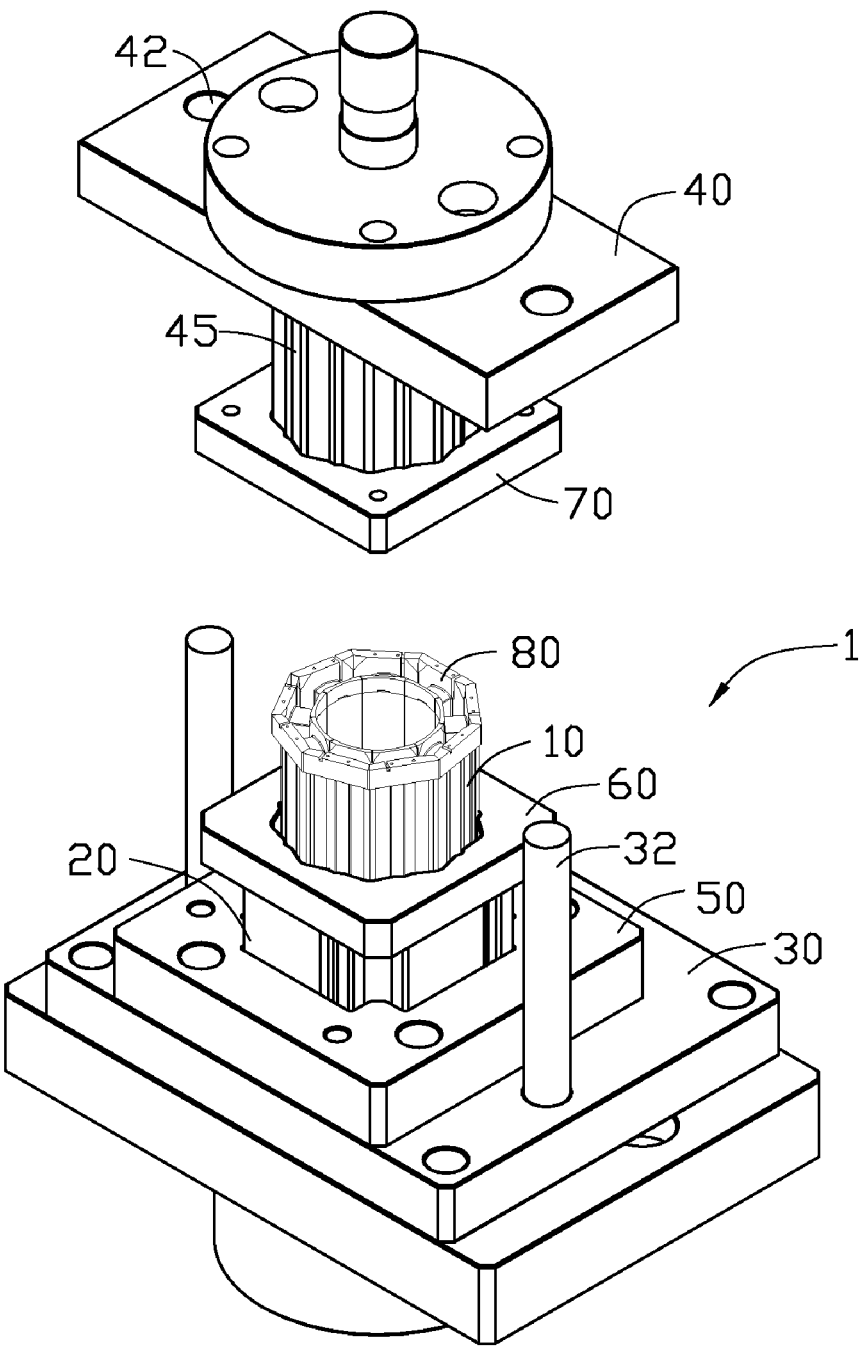
FIG. 4 is an assembled, isometric view of FIG. 1.

Referring to FIGS. 3 and 4, in assembly, the second positioning plate 50 is installed on the supporting device 30 using fasteners, such as screws or bolts. The lower die 31 is received in the opening 51 of the second positioning plate 50. The third positioning plate 70 is fixed to the lower portion of the upper die 45, by means of the interference fit between the upper die 45 and the opening 71 of the third positioning plate 70. In another embodiment, the third positioning plate 70 can be fixed to the lower portion of the upper die 45 using screws or other fasteners.

The lower portion of the outer stator 20 is inserted into the opening 51 of the second positioning plate 50, to allow the outer stator 20 to be immovably supported on the supporting device 30. The first positioning plate 60 is placed on the outer stator 20, with the recess 65 engaging with the upper portion of the outer stator 20. The inner stator 10 is inserted into the opening 61 of the first positioning plate 60. The pressing unit is operated to move the pressing device 40 towards the supporting device 30. The third positioning plate 70 and the upper die 45 cooperatively press the wire bracket 80 on the inner stator 10, to move the inner stator 10 into the receiving space 21 of the outer stator 20, along the opening 61 of the first positioning plate 60. The guiding posts 32 on the supporting device 30 engage in the through holes 42 of the pressing device 40, respectively, for guiding the pressing device 40 to move smoothly. When the lower portion of the inner stator 10 engages with the lower die 31 of the supporting device 30, the inner stator 10 is entirely assembled in the outer stator 20.

When the pressing unit is operated to move the pressing device 40 away from the supporting device 30, the assembled inner stator 10 and the outer stator 20 can be detached from the assembly mechanism 1.

In the assembly process, the opening 61 of the first positioning plate 60 guides the inner stator 10 into the outer stator 20, to prevent the inner stator 10 from deflecting, and to prevent the inner stator 10 from damaging the outer stator 20. The second positioning plate 50 positions the outer stator 20 on the supporting device 30, to prevent the outer stator 20 from moving. The third positioning plate 70 is fixed to the lower portion of the upper die 45, and presses the wire bracket 80 cooperating with the upper die 45. A contact area between the pressing device 40 and the wire bracket 80 is increased, which can protect the wire bracket 80 from being damaged if the upper die 45 deviates.

It is to be understood, however, that even though numerous characteristics and advantages of the present disclosure have been set forth in the foregoing description, together with details of the structure and function of the disclosure, the disclosure is illustrative only, and changes may be made in details, especially in matters of shape, size, and arrangement of parts within the principles of the disclosure to the full extent indicated by the broad general meaning of the terms in which the appended claims are expressed.

What is claimed is:

1. An assembly mechanism for pressing an inner stator into a receiving space of an outer stator, the assembly mechanism comprising:

a pressing unit comprising a supporting device to support the outer stator, and a pressing device movable relatively to the supporting device; and a first positioning plate to be attached to a top of the outer stator, the first positioning plate defining a first opening forming a clearance fit with the inner stator, wherein the first opening is operable to receive the inner stator and guide the inner stator to move into the receiving space of the outer stator under a pressing action of the pressing device.

2. The assembly mechanism of claim 1, further comprising a second positioning plate, wherein the second positioning plate is fixed on the supporting device, and defines a second opening to receive a lower portion of the outer stator.

3. The assembly mechanism of claim 1, further comprising an upper die, and a third positioning plate, wherein a wire bracket is to be installed on a top of the inner stator, the upper die perpendicularly extends down from the pressing device, the third positioning plate is fixed to a lower portion of the upper die to press the wire bracket installed on the inner stator.

4. The assembly mechanism of claim 1, wherein a bottom surface of the first positioning plate defines a recess communicating with the first opening of the first positioning plate, the recess matches the outer stator for engaging with an upper portion of the outer stator.

5. The assembly mechanism of claim 1, wherein the inner stator forms a plurality of flanges along the axial direction of the inner stator, and an inner wall bounding the first opening of the first positioning plate defines a plurality of guiding grooves matching the plurality of flanges.

6. The assembly mechanism of claim 1, wherein the pressing device defines two through holes, and the supporting device forms two guiding posts to be correspondingly inserted into the through holes.

7. An assembly method for pressing an inner stator into a receiving space of an outer stator, the assembly method comprising:
   providing a first positioning plate that defines a first opening forming a clearance fit with the inner stator, and attaching the first positioning plate on a top of the outer stator;
   inserting the inner stator into the first opening of the first positioning plate; and
   providing a pressing unit pressing the inner stator into the receiving space of the outer stator along the first opening of the first positioning plate.

8. The assembly method of claim 7, wherein the pressing unit comprises a supporting device to support the outer stator, and a pressing device movable relatively to the supporting device to press the inner stator.

9. The assembly method of claim 8, further comprising providing a second positioning plate fixed on the supporting device, wherein the second positioning plate defines a second opening to receive a lower portion of the outer stator.

10. The assembly method of claim 8, further comprising providing a third positioning plate, wherein a wire bracket is installed on a top of the inner stator, an upper die perpendicularly extends down from the pressing device, the third positioning plate is fixed to a lower portion of the upper die to press the inner stator.

11. The assembly method of claim 8, wherein the pressing device defines two through holes, and the supporting device forms two guiding posts to be correspondingly inserted into the through holes.

12. The assembly method of claim 7, wherein a bottom surface of the first positioning plate defines a recess communicating with the first opening of the first positioning plate, the recess matches the outer stator for engaging with an upper portion of the outer stator.

\* \* \* \* \*